(12) United States Patent
Bencheck et al.

(10) Patent No.: US 8,681,632 B2
(45) Date of Patent: Mar. 25, 2014

(54) CARRIER ETHERNET SERVICE BANDWIDTH ALLOCATION SYSTEMS AND METHODS

(75) Inventors: Michael U. Bencheck, Richardson, TX (US); Matthew W. Turlington, Richardson, TX (US); Scott R. Kotrla, Wylie, TX (US); William A. Bjorkman, Odenton, MD (US); Christopher N. DelRegno, Rowlett, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 94 days.

(21) Appl. No.: 13/361,680

(22) Filed: Jan. 30, 2012

(65) Prior Publication Data

US 2013/0194932 A1    Aug. 1, 2013

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |

(52) U.S. Cl.
USPC ......... 370/236.2; 370/229; 370/235; 370/236

(58) Field of Classification Search
USPC .............. 370/241–241.1, 464–469, 477, 370/235–236.2; 709/220–233
See application file for complete search history.

(56) References Cited

U.S. PATENT DOCUMENTS

| | | | |
|---|---|---|---|
| 2008/0095188 A1* | 4/2008 | Remy et al. | 370/468 |
| 2010/0131650 A1* | 5/2010 | Pok et al. | 709/226 |
| 2010/0246406 A1* | 9/2010 | Hill et al. | 370/241.1 |

OTHER PUBLICATIONS

The Metro Ethernet Forum (MEF), *Ethernet Local Management Interface (E-LMI)*, Technical Specification MEF 16, Jan. 2006.
Santitoro, Ralph, The Metro Ethernet Forum (MEF), *Metro Ethernet Services—A Technical Overview*, www.metroethernetforum.org, as accessed Dec. 1, 2011.

* cited by examiner

*Primary Examiner* — Abdullah Riyami
*Assistant Examiner* — Eric Myers

(57) ABSTRACT

Exemplary carrier Ethernet service bandwidth allocation systems and methods are disclosed herein. An exemplary method includes a carrier Ethernet service system 1) receiving an Ethernet layer operation, administration, and management ("OAM") protocol based message provided by a customer premises device to a network interface device over a user network interface ("UNI"), the Ethernet layer OAM protocol based message including a request to adjust an amount of bandwidth allocated to a carrier Ethernet service provided by the Ethernet service system to the customer premises device, and 2) adjusting, in response to the request, the amount of bandwidth allocated to the carrier Ethernet service. Corresponding methods and systems are also disclosed.

19 Claims, 8 Drawing Sheets

CARRIER ETHERNET SERVICE BANDWIDTH ALLOCATION SYSTEMS AND METHODS

BACKGROUND INFORMATION

Certain telecommunications service providers provide Ethernet services to one or more customers across wide area Ethernet services networks. Such services are commonly referred to as "carrier" Ethernet services.

Typically, a carrier Ethernet service provider allocates a certain amount of network bandwidth for a carrier Ethernet service based on a service level agreement ("SLA") between the service provider and a customer. To increase or decrease the amount of bandwidth allocated for the carrier Ethernet service, the customer must typically submit an order to the service provider (e.g., by way of an order entry web portal) and wait for the service provider to process the order and make appropriate changes to the carrier Ethernet service and/or network. This process of receiving and processing a separate order takes time and does not allow the customer to increase or decrease the bandwidth of the Ethernet service on-demand in real time.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary carrier Ethernet service bandwidth allocation systems and methods are disclosed herein. The exemplary systems and methods described herein may provide customers of carrier Ethernet services provided by an Ethernet service provider with capabilities to increase and/or decrease the amount of bandwidth allocated to Ethernet services on-demand. On-demand bandwidth adjustment may be performed without the customers having to go through a separate order entry submission process and/or portal (e.g., web portal) to submit orders for bandwidth adjustment. Such on-demand Ethernet service bandwidth allocation may provide customers with increased flexibility compared to traditional Ethernet service offerings.

For example, with on-demand carrier Ethernet service bandwidth allocation, a customer subscribing to a carrier Ethernet service may configure customer premises equipment to automatically initiate on-demand adjustments to the amount of bandwidth allocated to the carrier Ethernet service as may best suit the needs of the customer. For instance, the customer may configure the customer premises equipment to automatically initiate an on-demand increase of the bandwidth allocated to the carrier Ethernet service at a specific time each day (e.g., at the start of a time period during which usage of the carrier Ethernet service is typically high) and to automatically initiate an on-demand decrease of the bandwidth allocated to the carrier Ethernet service at a different time each day (e.g., at the end of a time period during which usage of the carrier Ethernet service is typically high and/or at the start of a time period during which usage of the carrier Ethernet service is typically low). Such flexibility may be appealing to certain customers and/or potential customers of carrier Ethernet services and may increase the demand for and/or customer satisfaction with carrier Ethernet services provided by a service provider.

These and other benefits and/or advantages of on-demand carrier Ethernet service bandwidth allocation will be made apparent by the following detailed description of exemplary carrier Ethernet service systems and methods.

Figure 1:
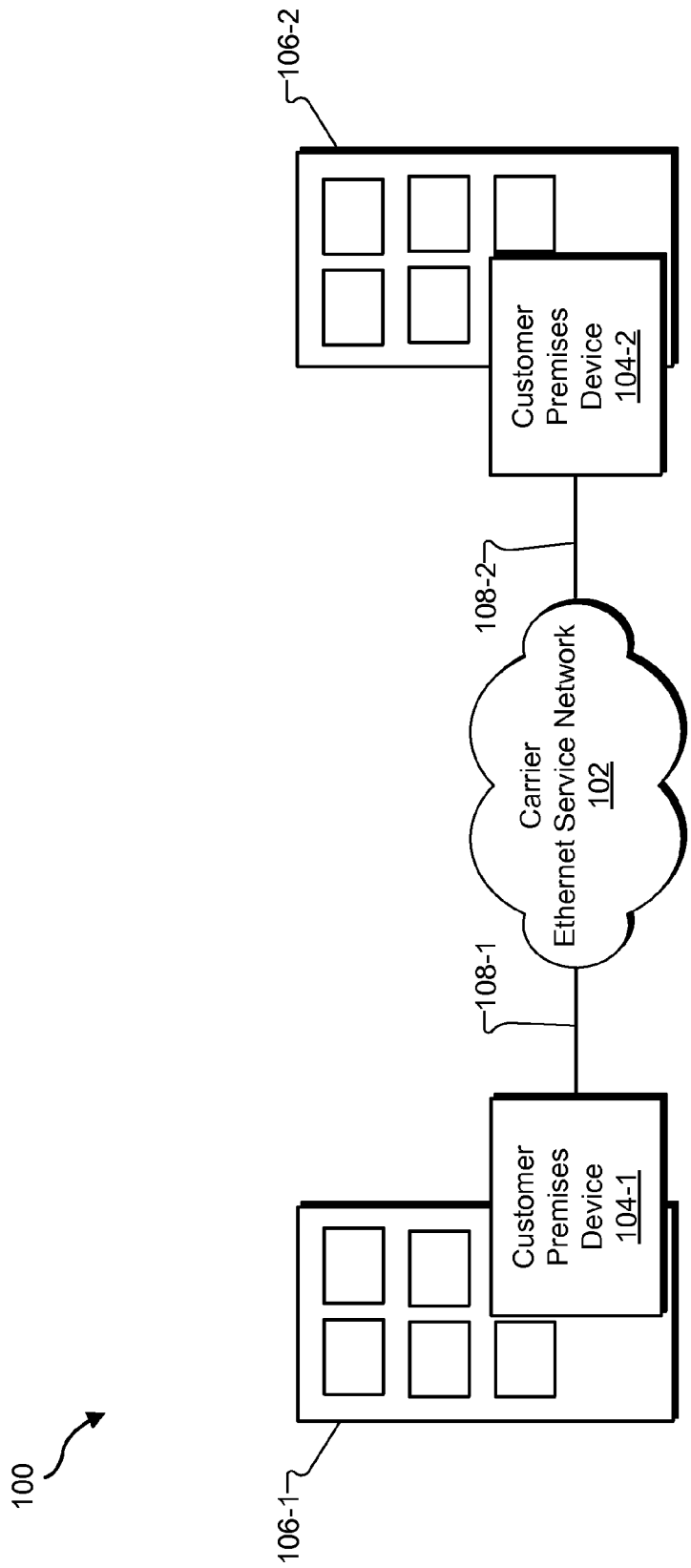
FIG. 1 illustrates an exemplary carrier Ethernet service system according to principles described herein.

FIG. 1 illustrates an exemplary carrier Ethernet service system 100 ("system 100"). As shown, system 100 may include a carrier Ethernet services network 102 ("network 102") across which an Ethernet service provider may provide carrier Ethernet services (or simply "Ethernet services") to one or more customers. Network 102 may include any suitable set of network elements (e.g., Ethernet switching devices) configured to provide a wide area infrastructure over which Ethernet services may be provided to customers who subscribe to the Ethernet services.

Network 102 may employ any transport technologies (e.g., transport protocols) capable of supporting carrier Ethernet services. For example, carrier Ethernet connections may be carried over synchronous digital hierarchy ("SDH")/synchronous optical networks ("SONET"), multiprotocol label switching ("MPLS") networks (e.g., as "pseudowires using MPLS label switched paths ("LSPs") inside an outer MPLS tunnel), and/or carrier-Ethernet transport ("CET").

Network elements included in network 102 may be configured to communicate one with another using any carrier Ethernet service network control plane protocols suitable for providing a wide area infrastructure over which Ethernet services may be provided. Such communications may be used to control and/or manage allocation of bandwidth for Ethernet services, such as by controlling and/or managing provisioning of bandwidth for Ethernet services and/or de-provisioning (e.g., tearing down or reassigning) of bandwidth allocated for Ethernet services. For example, network elements included in network 102 may be configured to communicate using control plane protocols such as Open Shortest Path First Traffic Engineering ("OSPF-TE") protocol, Resource Reservation Protocol Traffic Engineering ("RSVP-TE") protocol, Border Gateway Protocol ("BGP"), Multiprotocol Label Switching Transport Profile ("MPLS-TP") protocol, and any additional or alternative control plane protocol capable of controlling provisioning and/or de-provisioning of bandwidth for Ethernet services.

Any suitable Ethernet services may be provided across network 102. Examples of such services may include "E-Line" services and "E-LAN" services. An E-Line service connects two customer endpoints over a wide area Ethernet service network. In certain implementations, an E-Line service connection may include a point-to-point Ethernet Virtual circuit ("EVC") between two User Network Interfaces ("UNIs") that connect two respective customer endpoints to the EVC. An E-LAN service connects a set of customer endpoints in a way that gives the customer the appearance of a bridged Ethernet network connecting the endpoints. An E-LAN service connection may include a multipoint EVC between multiple UNIs that connect multiple respective customer endpoints to the EVC. These examples of Ethernet services are illustrative only. Network 102 may be configured to provide any other carrier Ethernet services.

As further shown in FIG. 1, system 100 may include customer premises devices 104-1 and 104-2 located at customer premises 106-1 and 106-2, respectively. Customer premises devices 104-1 and 104-2 may function as endpoints to one or more Ethernet services provided across network 102. Customer premises 106-1 and 106-2 may be located at different geographic locations interconnected by a physical transport medium (e.g., an optical transport medium such as optical fiber) capable of supporting Ethernet layer service connections (e.g., data link layer ("layer-2") service connections in the Open Systems Interconnection ("OSI") reference model) between customer premises devices 104-1 and 104-2. In certain implementations, customer premises 106-1 and 106-2 may include different business locations of a customer subscribing to one or more carrier Ethernet services provided across network 102.

Customer premises devices 104-1 and 104-2 may be configured to communicate with network elements (e.g., network interface devices) included in network 102 by way of access links referred to as user network interfaces ("UNIs") 108-1 and 108-2, respectively. Communications across UNIs 108-1 and 108-2 may be performed in accordance with any suitable UNI protocols, including any suitable Ethernet layer operation, administration, and management ("OAM") protocol.

Figure 2:
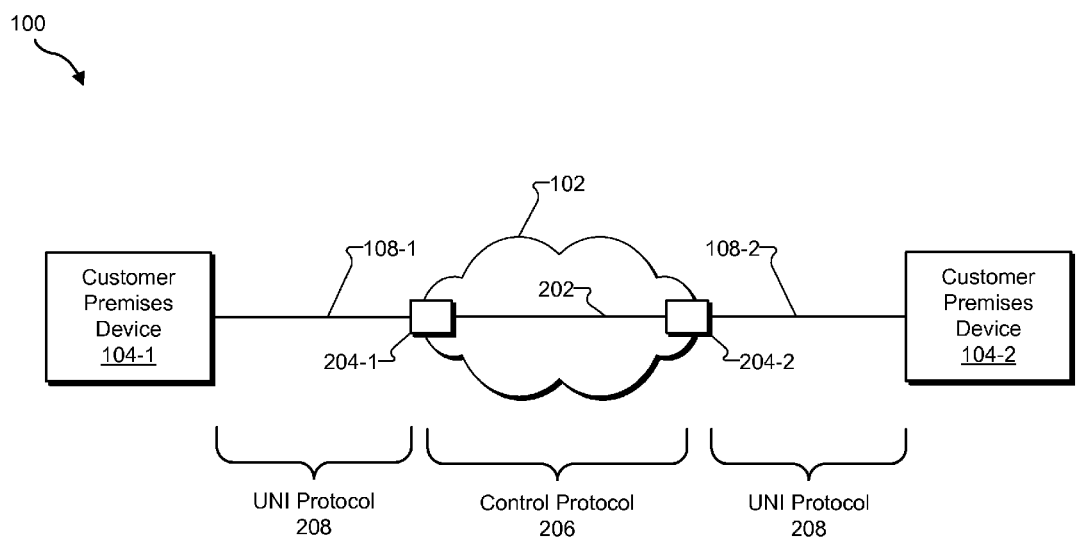
FIG. 2 illustrates an exemplary implementation of the system of FIG. 1 in which customer premises devices are customer endpoints of an Ethernet virtual circuit provided across a carrier Ethernet service network according to principles described herein.

FIG. 2 illustrates an example in which customer premises devices 104-1 and 104-2 are customer endpoints of an EVC 202 provided across network 102. As shown, EVC 202 may form a connection between network interface devices 204-1 and 204-2, which may be network elements included in network 102. EVC 202 may be controlled and/or managed by network interface devices 204-1 and 204-2 and other network elements communicating by way of a control protocol 206, which may include one or more of the Ethernet network control plane protocols disclosed herein. For example, one or more of the control plane protocols disclosed herein may be used by network elements to dynamically adjust the amount of bandwidth allocated to EVC 202 and/or to an Ethernet service supported by EVC 202.

Customer premises devices 104-1 and 104-2 may communicate with network interface devices 204-1 and 204-2 by way of UNIs 108-1 and 108-2, respectively, to access EVC 202 and to operate as customer endpoints of EVC 202. Communications across UNIs 108-1 and 108-2 may be in accordance with a UNI protocol 208, which may include any suitable UNI protocols such as one or more of the UNI protocols disclosed herein.

In some examples, certain communications across UNIs 108-1 and 108-2 may be performed in accordance with Ethernet Local Management Interface ("E-LMI") protocol. E-LMI protocol has traditionally been used to provide information in a single direction only—from an Ethernet service network to customer premises equipment. E-LMI signaling in this direction may be referred to as "downstream E-LMI signaling." Such E-LMI protocol communications traditionally provide information to customer premises equipment that enables auto-configuration of the customer premises equipment. E-LMI protocol communications also traditionally provide information to customer premises equipment about the status of UNIs and/or Ethernet services (e.g., the status of EVC 202). Accordingly, customer premises device 104-1 may receive, by way of E-LMI protocol communications received from network 102, information about the status of UNI 108-1 and/or an Ethernet service provided across network 102.

In implementations employing downstream E-LMI signaling, system 100 may be configured to extend the E-LMI protocol to support communications across UNIs 108-1 and 108-2 in the opposite direction—from customer premises devices 104-1 and 104-2 to network 102. E-LMI signaling in this direction may be referred to as "upstream E-LMI signaling." Accordingly, customer premises device 104-1 may be configured to use E-LMI protocol based communications, which are a defined extension to an E-LMI protocol, to communicate with one or more network elements included in network 102. System 100 may define and support any suitable set of E-LMI based protocol messages to provide E-LMI protocol based communications from customer premises device 104-1 to network 102. Such messages may be used to carry requests for on-demand Ethernet service bandwidth allocation from customer premises device 104-1 to network 102, and network 102 may be configured to receive and process such requests to allocate bandwidth on-demand in accordance with the requests.

Figure 3:
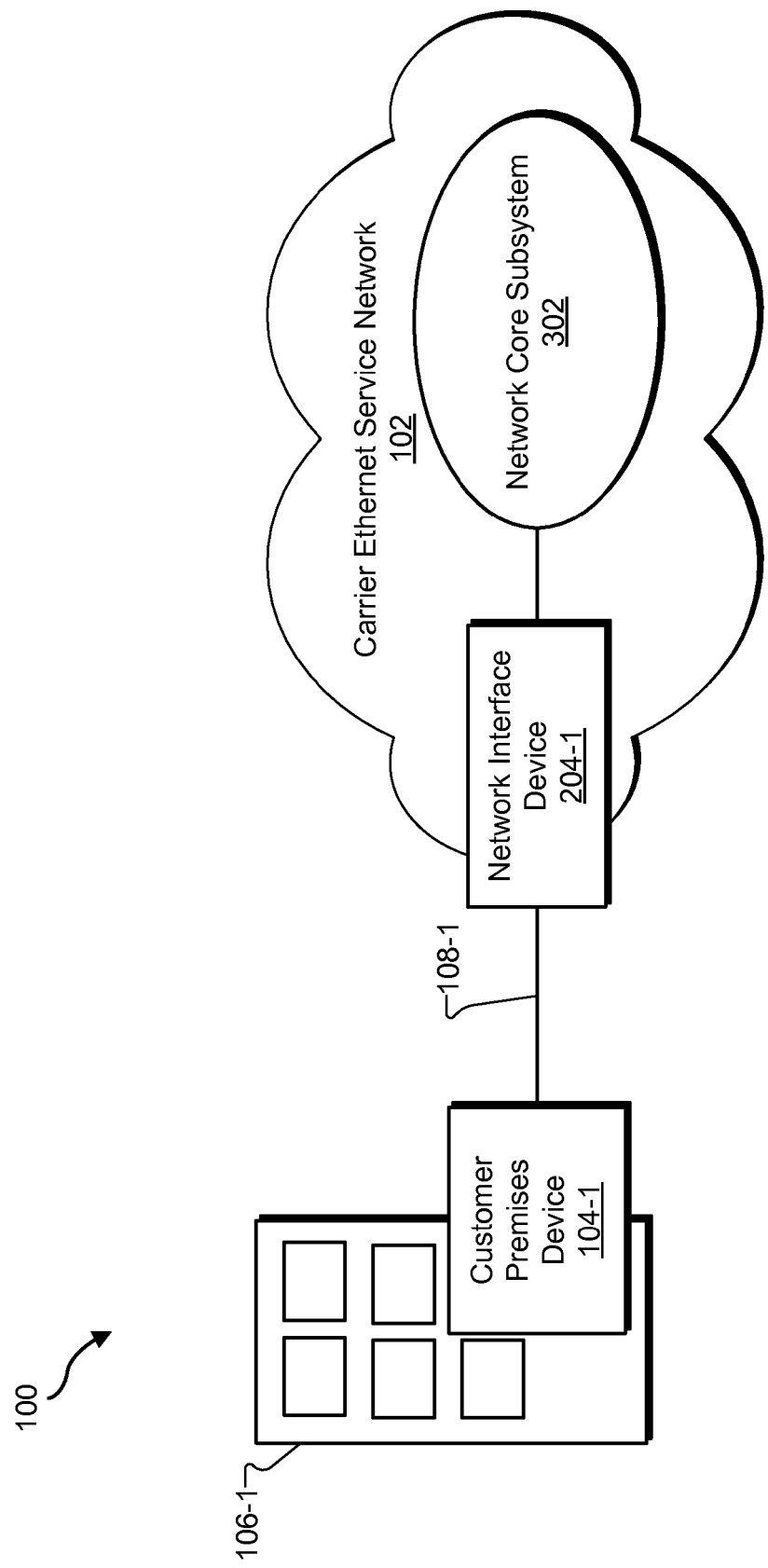
FIG. 3 illustrates an example in which a customer premises device is a customer endpoint to a carrier Ethernet service provided across a carrier Ethernet service network according to principles described herein.

To illustrate, FIG. 3 shows an example in which customer premises device 104-1 is a customer endpoint to an Ethernet service provided across network 102. Network elements included in network 102 may allocate a particular amount of network bandwidth (e.g., a maximum bandwidth limit) to the Ethernet service.

Customer premises device 104-1 may be configured to generate and transmit a bandwidth allocation request across UNI 108-1 to network interface device 204-1 to request that the amount of bandwidth allocated to an Ethernet service be adjusted on-demand. For example, customer premises device 104-1 may generate and transmit a bandwidth allocation request message defined in accordance with an extended Ethernet layer OAM protocol such as an E-LMI protocol extended to support upstream E-LMI signaling as described herein. Inasmuch as the message is defined in accordance with an extended Ethernet layer OAM protocol such as an E-LMI protocol extended to support upstream E-LMI signaling, the message may be referred to as an "Ethernet layer OAM protocol based message" or "E-LMI protocol based message." The message may include data representative of a request to adjust the amount of bandwidth allocated to the Ethernet service on-demand.

Customer premises device 104-1 may be configured to generate and send a bandwidth allocation request message in response to any predefined bandwidth adjustment trigger event ("trigger event"). As an example, customer premises device 104-1 may generate and send a bandwidth allocation request message in response to customer premises device 104-1 receiving predefined user input provided by a user of customer premises device 104-1. Such user input may be provided by the user when the customer subscribing to the Ethernet service desires to adjust the bandwidth allocated to the Ethernet service on-demand.

As another example, customer premises device 104-1 may be configured to automatically generate and send a bandwidth allocation request based on a trigger event that is detected by customer premises device 104-1 based on a trigger event heuristic implemented by customer premises device 104-1. The heuristic may include data specifying one or more conditions, the satisfaction of which may be detected by customer premises device 104-1 and trigger the generation and sending of the request. To illustrate, the heuristic may specify one or more time periods, such as one or more specific time periods within a day, that are to be used by customer premises device 104-1 as a basis to automatically request that the bandwidth of the Ethernet service be adjusted on-demand (e.g., in conjunction with start times and/or end times of the time periods). For instance, customer premises device 104-1 may automatically request that bandwidth be increased on-demand at the start of a predefined time period specified by the heuristic and during which there is typically a high level of usage of the Ethernet service or at the end of a predefined time period specified by the heuristic and during which there is typically a low level of usage of the Ethernet service, or that bandwidth be decreased on-demand at the start of a predefined time period specified by the heuristic and during which there is typically a low level of usage of the Ethernet service or at the end of a predefined time period specified by the heuristic and during which there is typically a high level of usage of the Ethernet service.

An another example, customer premises device 104-1 may be configured to automatically generate and send a bandwidth allocation request based on the status of the Ethernet service, UNI 108-1, and/or network 102. For example, customer premises device 104-1 may receive status information for the Ethernet service, UNI 108-1, and/or network 102 from network 102 by way of downstream E-LMI signaling across UNI 108-1. Based at least in part on the status information and a heuristic specifying one or more conditions related to the status information, the satisfaction of which indicates an occurrence of a trigger event, customer premises device 104-1 may automatically generate and send a bandwidth allocation request. To illustrate, E-LMI signaling may indicate one or more attributes of an EVC (e.g., EVC 202) associated with the Ethernet service. Based on the attributes and one or more conditions specified in the heuristic, customer premises device 104-1 may detect a need for additional bandwidth for the Ethernet service. In response to the detection, customer premises device 104-1 may automatically generate and send a bandwidth allocation request message to request that the bandwidth for the Ethernet service be increased, such as by provisioning additional bandwidth for the Ethernet service.

Figure 4:
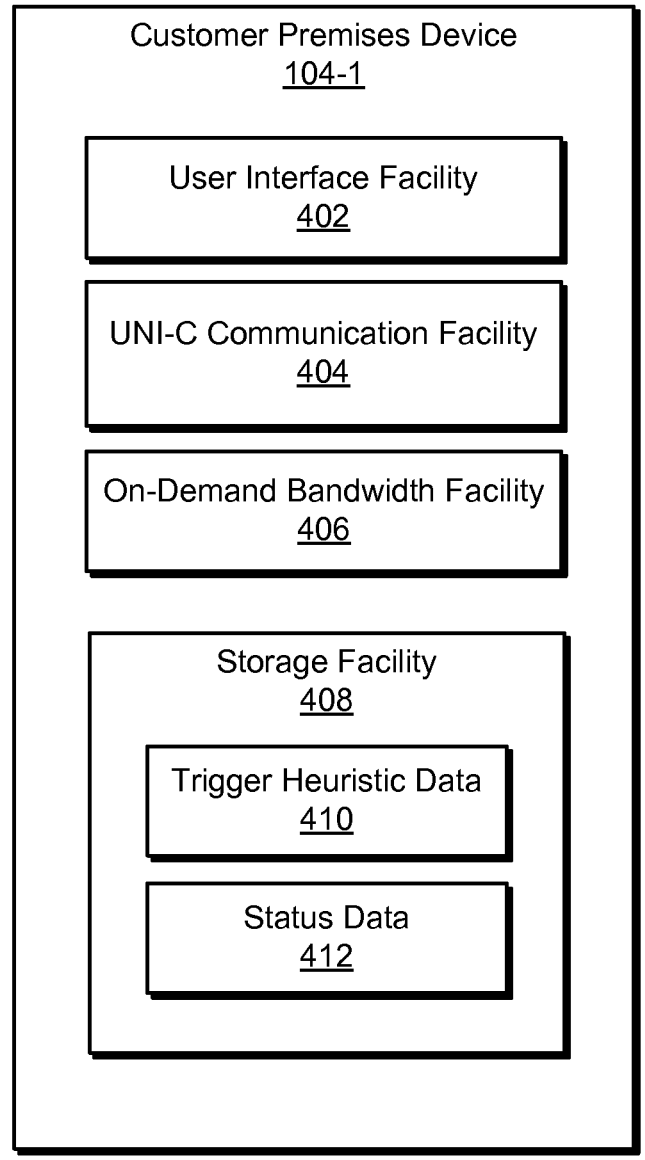
FIG. 4 illustrates exemplary components of a customer premises device according to principles described herein.

FIG. 4 illustrates exemplary components of customer premises device 104-1. As shown, customer premises device 104-1 may include, without limitation, a user interface facility 402, a UNI-C (i.e., UNI-customer) communication facility 404, an on-demand bandwidth facility 406, and a storage facility 408 selectively and communicatively coupled to one another. It will be recognized that although facilities 402-408 are shown to be separate facilities in FIG. 1, any of facilities 402-408 may be combined into fewer facilities, such as into a single facility, or divided into more facilities as may serve a particular implementation.

User interface facility 402 may be configured to provide a user interface (e.g., a graphical user interface) through which a user of customer premises device 104-1 may interact with customer premises device 104-1, including to utilize a carrier Ethernet service accessed by customer premises device 104-1. Through the user interface, the user of customer premises device 104-1 may provide predefined user input to direct customer premises device 104-1 to request an on-demand adjustment to the amount of bandwidth allocated to the Ethernet service accessed by customer premises device 104-1.

UNI-C communication facility 404 may be configured to send and receive communications over UNI 108-1 in relation to accessing an Ethernet service. The communications may include sending and receiving UNI protocol messages (e.g., Ethernet layer OAM protocol based messages such as E-LMI protocol based messages) over UNI 108-1. To this end, UNI-C communication facility 404 may be configured to convert communications and/or data internal to customer premises device 104 to UNI protocol messages and/or to convert UNI protocol messages received over UNI 108-1 to one or more internal data and/or communications formats. By communicating over UNI 108-1, UNI-C communication facility 404 may access a carrier Ethernet service provided by network 102 such that customer premises device 104 may function as a customer endpoint of the Ethernet service.

On-demand bandwidth facility 406 may be configured to detect an occurrence of a predefined trigger event, such as any of the exemplary trigger events described herein, in any suitable way. In response to the detection of a trigger event, on-demand bandwidth facility 406 may initiate a request to adjust the amount of bandwidth allocated to an Ethernet service on-demand. The request may be initiated in any suitable way. For example, on-demand bandwidth facility 406 may direct UNI-C communication facility 404 to generate and transmit a bandwidth allocation request message over UNI 108-1 to request an on-demand adjustment to the amount of bandwidth allocated to the Ethernet service across network 102.

Storage facility 408 may be configured to store data generated and/or used by one or more of facilities 402-406. For example, storage facility 408 may store trigger heuristic data 410 representative of a predefined trigger heuristic and/or status data 412 representative of information indicating the status of an Ethernet service and/or UNI 108-1 over which the Ethernet service is accessed by customer premises device 104-1. Storage facility 408 may store additional or alternative data in the other examples.

System 100 may dynamically adjust the amount of bandwidth allocated to an Ethernet service on-demand, in real-time, and/or without human operator intervention in response to a bandwidth allocation request transmitted by customer premises device 104-1. System 100 may dynamically adjust the amount of bandwidth allocated to the Ethernet service in any suitable way. For example, one or more network elements included in network 102 may generate, communicate, and/or receive control plane protocol messages (e.g., one or more RSVP-TE protocol messages in an MPLS transport network and/or one or more information technology ("IT") messages in a carrier Ethernet transport network) that instruct the network elements to adjust the amount of bandwidth allocated to the Ethernet service. The network elements may respond to the control plane protocol messages by performing one or more operations to adjust the amount of bandwidth allocated to the Ethernet service, such as by provisioning and/or de-provisioning Ethernet network bandwidth resources associated with the Ethernet service.

Figure 5:
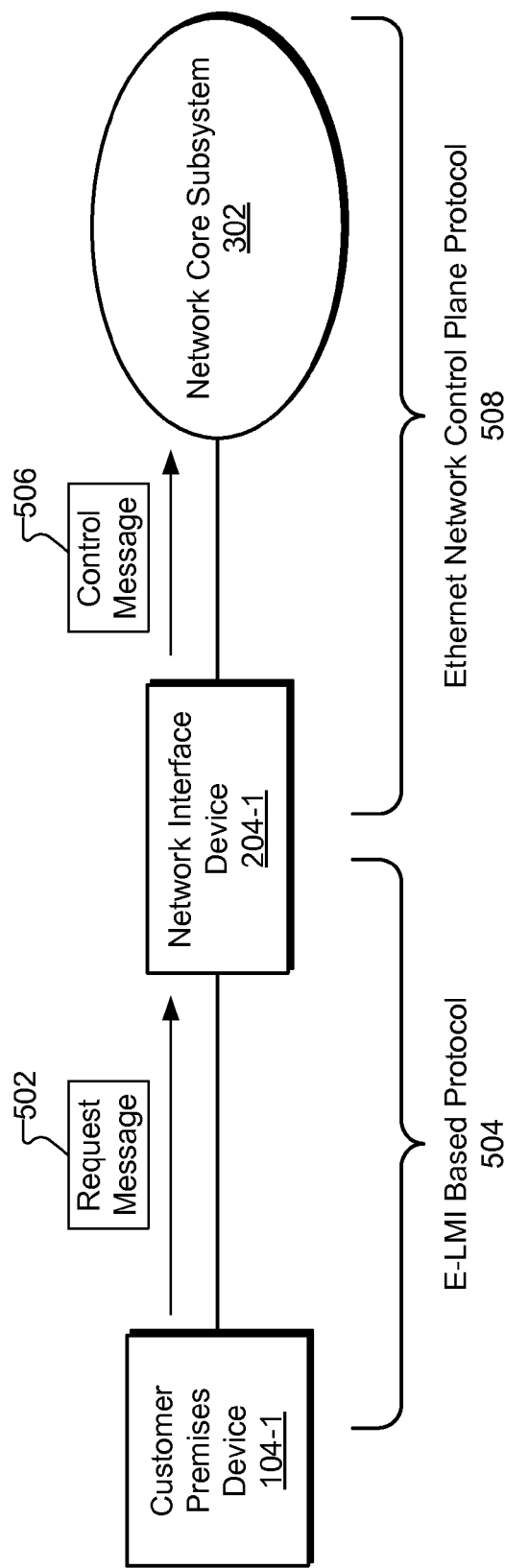
FIG. 5 illustrates transmission of exemplary messages in accordance with exemplary communications protocols according to principles described herein.

To illustrate, in the example illustrated in FIG. 3, network interface device 204-1 may receive a bandwidth allocation request transmitted by customer premises device 104-1 across UNI 108-1. Network interface device 204-1 may be configured to translate the bandwidth allocation request message from a UNI protocol 208 to a control protocol 206. For example, network interface device 204-1 may be configured to translate an Ethernet layer OAM protocol based message, such as an E-LMI protocol based message, to an Ethernet network control plane protocol message. The control plane protocol message may include data representative of the request and/or data configured to instruct one or more network elements included in network 102 to perform one or more operations to adjust the bandwidth allocated for the Ethernet service in accordance with the request. Network interface device 204-1 may transmit the control plane protocol message to a network core subsystem 302 included in network 102. FIG. 5 illustrates transmission of an exemplary request message 502 from customer premises device 104-1 to network interface device 204-1 in accordance with an E-LMI based protocol 504 and transmission of an exemplary control message 506 from network interface device 204-1 to network core subsystem 302 in accordance with an Ethernet network control plane protocol 508.

Figure 6:
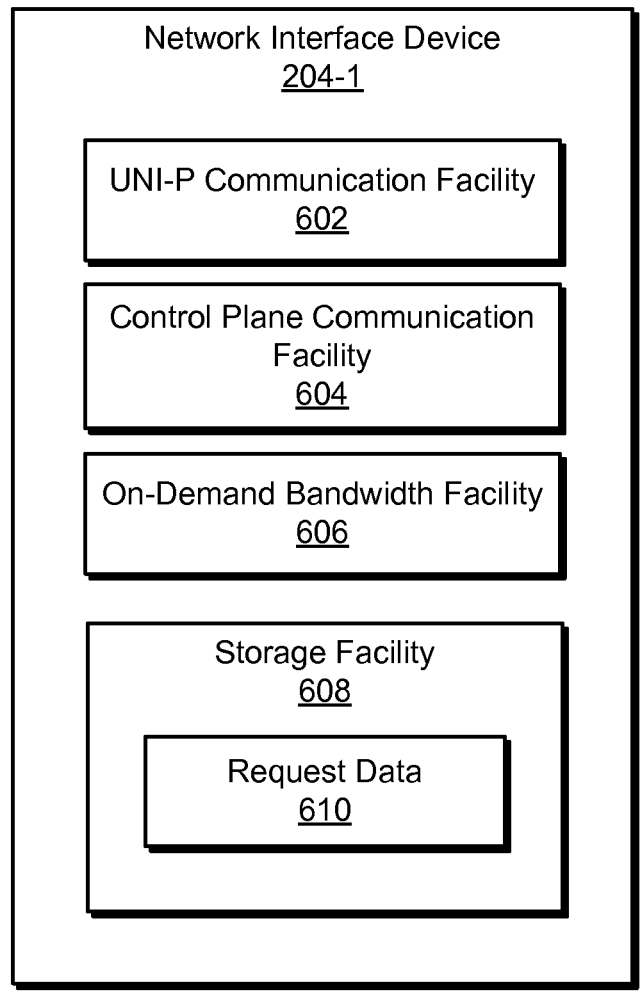
FIG. 6 illustrates exemplary components of a network interface device according to principles described herein.

FIG. 6 illustrates exemplary components of network interface device 204-1. As shown, network interface device 204-1 may include, without limitation, a UNI-P (i.e., UNI-provider) communication facility 602, a control plane communication facility 604, an on-demand bandwidth facility 606, and a storage facility 608 selectively and communicatively coupled to one another. It will be recognized that although facilities 602-608 are shown to be separate facilities in FIG. 1, any of facilities 602-608 may be combined into fewer facilities, such as into a single facility, or divided into more facilities as may serve a particular implementation.

UNI-P communication facility 602 may be configured to send and receive communications over UNI 108-1 in relation to providing an Ethernet service for access by customer premises device 104-1. The communications may include sending and receiving UNI protocol messages (e.g., Ethernet layer OAM protocol based messages such as E-LMI protocol based messages) over UNI 108-1. To this end, UNI-P communication facility 602 may be configured to convert communications and/or data internal to network premises device 204-1 and/or network 102 to UNI protocol messages and/or to convert UNI protocol messages received over UNI 108-1 to one or more internal data and/or communications formats.

Control plane communication facility 604 may be configured to send and receive control plane messages to/from one or more other network elements included in network 102, including to one or more network core element included in network core subsystem 302. To this end, control plane communication facility 604 may be configured to convert communications and/or data internal to network premises device 204-1 to control plane protocol messages and/or to convert control plane protocol messages received from one or more other network elements to one or more internal data and/or communications formats.

On-demand bandwidth facility 606 may be configured to process a bandwidth allocation request received by UNI-P communication facility 602 from customer premises device 104-1 over UNI 108-1. For example, on-demand bandwidth facility 606 may translate or direct UNI-P communication facility 602 and/or control plane communication facility 604 to translate the bandwidth allocation request from a UNI protocol to a control plane protocol (e.g., from E-LMI based protocol 504 to Ethernet network control plane protocol 508). The translation may be performed in any suitable way.

On-demand bandwidth facility 606 may be further configured to send a control plane protocol message (e.g., a control plane protocol message translated from a UNI protocol based message) to network core subsystem 302 (e.g., to one or more network core elements included in network core subsystem 302). The control plane protocol message is configured to instruct network core subsystem 302 to perform one or more operations to adjust the bandwidth allocated to the Ethernet service across network 102 in accordance with a bandwidth allocation request received from customer premises device 104-1.

In certain implementations, on-demand bandwidth facility 606 may be configured to check bandwidth throughout network 102 before and/or after sending a control plane protocol message. For example, if a request is to increase the amount of bandwidth allocated to an Ethernet service, on-demand bandwidth facility 606 may direct network interface device 204-1 to communicate with one or more other network elements to determine whether sufficient bandwidth resources are available to fulfill the request. If sufficient bandwidth resources are available across network 102, on-demand bandwidth facility 606 may direct network interface device 204-1 to proceed to send the control plane protocol message to network core subsystem 302 to effectuate the requested change. If, on the other hand, sufficient bandwidth resources are unavailable in network 102, on-demand bandwidth facility 606 may direct network interface device 204-1 to elect not to send the control plane protocol message to network core subsystem 302 and to notify customer premises device 104-1 that sufficient bandwidth resources are not available to fulfill the request.

As another example, on-demand bandwidth facility 606 may direct network interface device 204-1 to check bandwidth throughout network 102 after sending a control plane protocol message to determine whether a requested adjustment to the amount of bandwidth allocated to the Ethernet service has been properly effectuated in network 102. For example, on-demand bandwidth facility 606 may direct network interface device 204-1 to communicate with one or more network elements included in network core subsystem 302 to request bandwidth status information associated with the Ethernet service. The bandwidth status information may be received and used by on-demand bandwidth facility 606 to determine whether the adjustment has been properly effectuated and may provide one or more notifications of the determination.

In addition or alternative to network interface device 204-1 checking bandwidth availability of network 102, one or more network elements included in network core subsystem 302 may check bandwidth availability of network core subsystem 302 and report the availability to network interface device 204-1.

Storage facility 608 may be configured to store data generated and/or used by one or more of facilities 602-606. For example, storage facility 608 may store request data 610 representative of one or more bandwidth allocation requests that have been received by network interface device 204-1. Storage facility 608 may store additional or alternative data in the other examples.

Returning to FIG. 5, network core subsystem 302 may include one or more network elements configured to perform operations to provide Ethernet services across a core of network 102. Network core subsystem 302 may be configured to receive control message 506 from network interface device 204-1 and to perform one or more operations based on data included in control message 506. For example, control message 506 may include data instructing network core subsystem 302 to perform one or more operations to increase or decrease the amount of bandwidth allocated to an Ethernet service across network 102. Network core subsystem 302 may adjust the bandwidth allocated to an Ethernet service in any suitable way, including by provisioning and/or de-provisioning bandwidth resources associated with the Ethernet service.

In certain implementations, before performing operations to adjust the amount of bandwidth allocated to an Ethernet service as instructed by control message 506, network core subsystem 302 may determine whether sufficient bandwidth resources are available to fulfill the request. If sufficient resources are determined to be available, network core subsystem 302 will then perform one or more operations to adjust the amount of bandwidth allocated to the Ethernet service, such as by provisioning bandwidth resources to increase the amount of bandwidth allocated for the Ethernet service. If sufficient resources are determined to be unavailable, network core subsystem 302 may provide an error message to network interface device 204-1, which may forward the error message to customer premises device 104-1 to indicate that the request was not fulfilled. Network core subsystem 302 may work together with network interface device 204-1 to determine whether sufficient bandwidth resources are available to fulfill the request.

Figure 7:
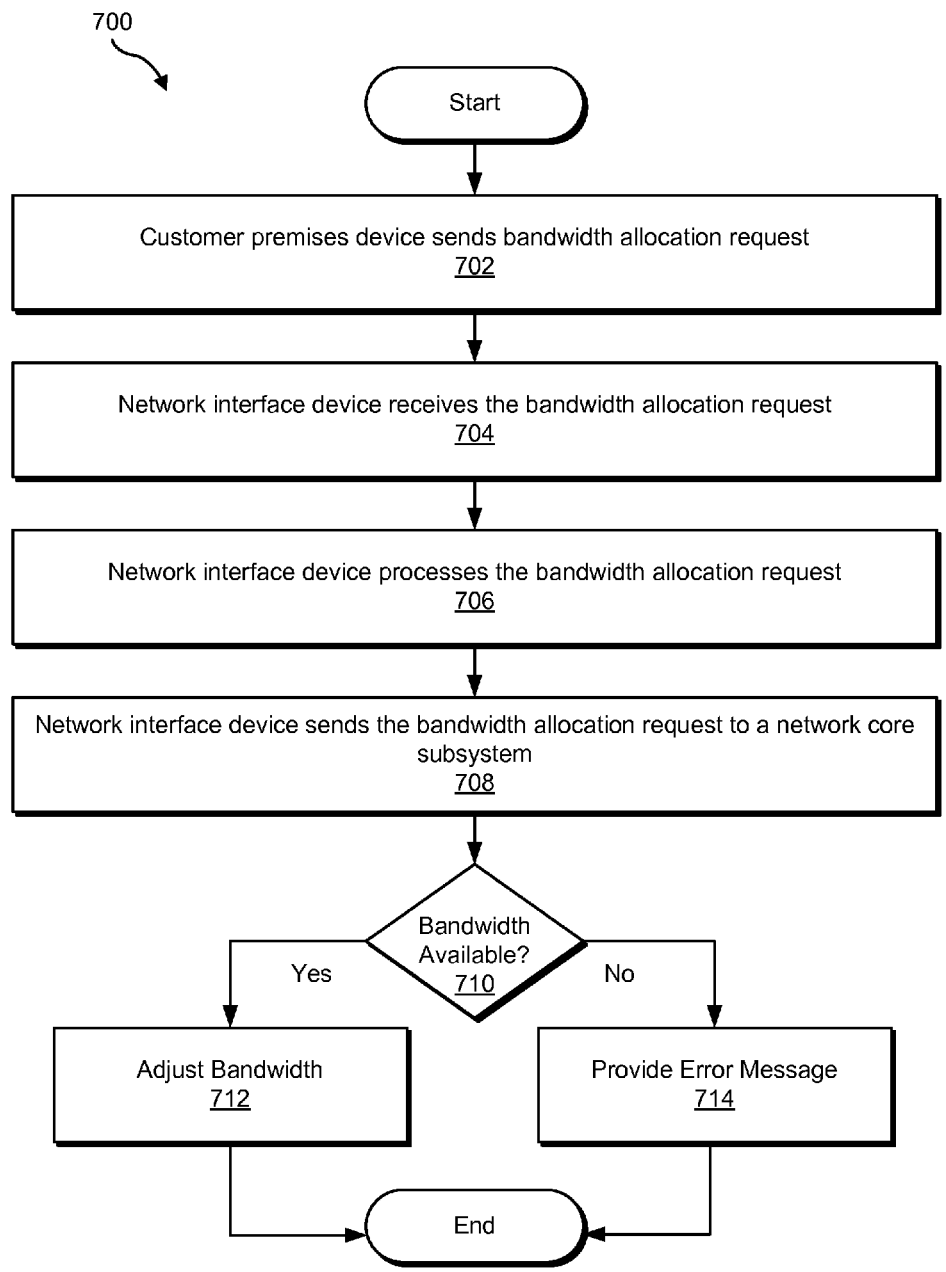
FIG. 7 illustrates an exemplary carrier Ethernet service bandwidth allocation method according to principles described herein.

FIG. 7 illustrates an exemplary carrier Ethernet service bandwidth allocation method 700. While FIG. 7 illustrates exemplary steps according to one embodiment, other embodiments may omit, add to, reorder, combine, and/or modify any of the steps shown in FIG. 7. One or more of the steps shown in FIG. 7 may be performed by system 100 and/or components of system 100 such as customer premises device 104-1, network interface device 204-1, and/or network core subsystem 302.

In step 702, a customer premises device sends a bandwidth allocation request requesting that an amount of bandwidth allocated to a carrier Ethernet service be adjusted. Step 702 may be performed in any of the ways described herein. For example, customer premises device 104-1 may transmit a UNI protocol message to network interface device 204-1 over UNI 108-1 to request the bandwidth adjustment, such as described herein. In certain examples, the customer premises device may send the bandwidth allocation request in response to the detected bandwidth adjustment trigger event, as described herein.

In step 704, a network interface device receives the bandwidth allocation request transmitted by the customer premises device over the UNI. Step 704 may be performed in any of the ways described herein. For example, network interface device 204-1 they received a UNI protocol message carrying data representative of the bandwidth allocation request from customer premises device 104-1 over UNI 108-1.

In step 706, the network interface device processes the bandwidth allocation request. Step 706 may be performed in any of the ways described herein. For example, the network interface device may translate a UNI protocol message carrying data representative of the bandwidth allocation request to a control plane message configured to instruct one or more network elements to perform one or more operations to adjust the amount of bandwidth allocated to the Ethernet service.

In step 708, the network interface device sends the bandwidth allocation request to a network core subsystem. Step 708 may be performed in any of the ways described herein. For example, network interface device 204-1 may send a control plane protocol message carrying data configured to instruct one or more network elements to perform one or more operations to adjust the amount of bandwidth allocated to the Ethernet service in accordance with the request.

In step 710, the network interface device and/or network core subsystem may determine whether sufficient bandwidth is available to fulfill the bandwidth allocation request. Step 710 may be performed in any of the ways described above. For example, network elements included in the network core subsystem may determine whether the network elements have sufficient bandwidth resources available and report the determination to the network interface device.

When sufficient bandwidth is available, processing may move from step 710 to step 712. In step 712, the amount of bandwidth allocated to the Ethernet service is adjusted, such as described herein. For example, the network interface device and one or more network elements included in the network core subsystem may perform operations as instructed by a control plane protocol message to adjust the bandwidth allocated to the Ethernet service. When sufficient bandwidth is not available, processing will move from step 710 to step 714. In step 714, an error message may be provided to the network interface device and/or the customer premises device, such as described herein. After step 712 or step 714 is performed, method 700 may end.

In certain examples, step 710 may be performed only when the request is for an increase to the amount of bandwidth allocated to the Ethernet service. If the request is for a decrease to the amount of bandwidth allocated to the Ethernet service, step 710 may be omitted or skipped, and processing of method 700 may move from step 708 to step 712.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 8:
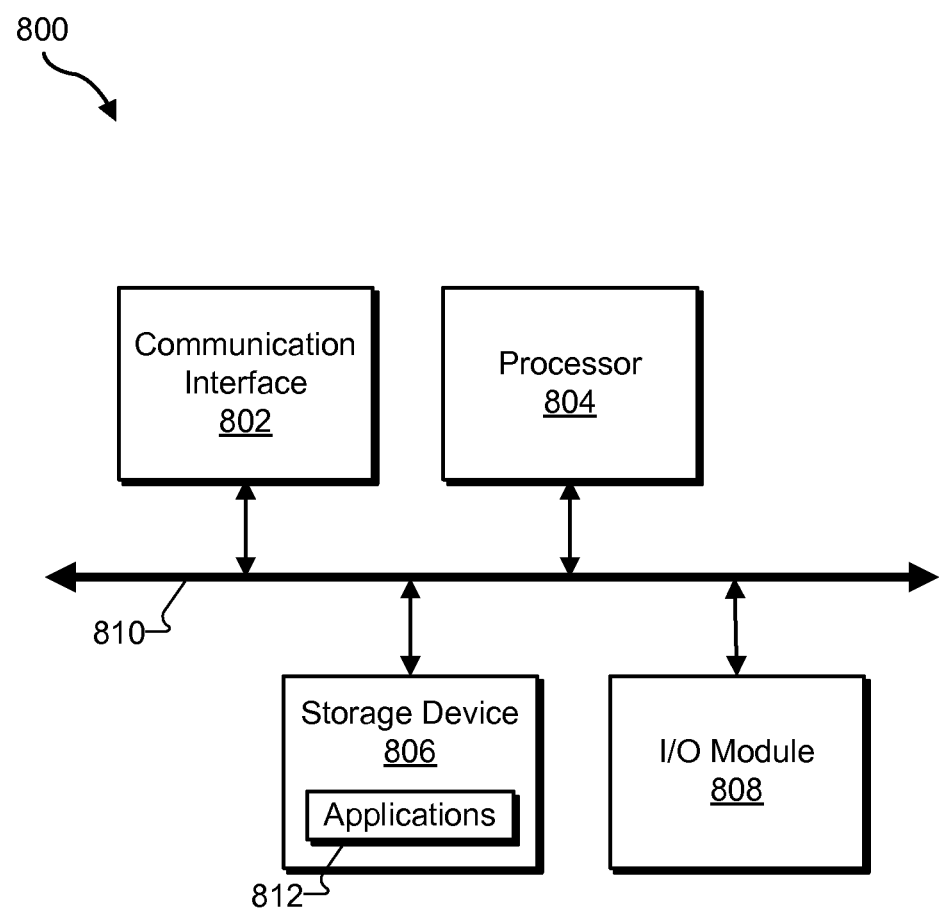
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, and any other suitable interface.

Processor 804 generally represents any type or form of processing unit capable of processing data or interpreting, executing, and/or directing execution of one or more of the instructions, processes, and/or operations described herein. Processor 804 may execute and/or direct execution of operations as directed by one or more applications 812 (which may include collaborative playlist facility 112) or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with user interface facility 402, UNI-C communication facility 404, on-demand bandwidth facility 406, UNI-P communication facility 602, control plane communication facility 604, and/or on-demand bandwidth facility 606. Likewise, storage facility 408 and/or storage facility 608 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a carrier Ethernet service system, an Ethernet layer operation, administration, and management ("OAM") protocol based message provided by a customer premises device to a network interface device over a user network interface ("UNI"), the Ethernet layer OAM protocol based message including a request to adjust an amount of bandwidth allocated to a carrier Ethernet service provided by the Ethernet service system to the customer premises device; and
   adjusting, by the carrier Ethernet service system in response to the request, the amount of bandwidth allocated to the carrier Ethernet service,
   wherein the receiving comprises:
      receiving the Ethernet layer OAM protocol based message transmitted by the customer premises device over the UNI;
      translating the Ethernet layer OAM protocol based message to a carrier Ethernet service network control plane protocol message; and
      sending the carrier Ethernet service network control plane protocol message to a network core subsystem, the carrier Ethernet service network control plane protocol message configured to instruct the network core subsystem to adjust the bandwidth allocated to the carrier Ethernet service across a carrier Ethernet service network in accordance with the request, and
   wherein the UNI is an access link from the customer premises device to the network interface device, and the network core subsystem is upstream of the network interface device such that the bandwidth allocated to the carrier Ethernet service is adjusted upstream of the network interface device.

2. The method of claim 1, wherein the Ethernet layer OAM protocol based message comprises an upstream Ethernet local management interface ("E-LMI") protocol based message.

3. The method of claim 2, wherein the upstream E-LMI protocol based message is an extension of an Ethernet local management interface ("E-LMI") protocol.

4. The method of claim 1, wherein the adjusting is performed in real time to adjust the amount of bandwidth allocated to the carrier Ethernet service on-demand in response to the request.

5. The method of claim 4, wherein the adjusting comprises one of:
   provisioning additional bandwidth for the carrier Ethernet service; and
   de-provisioning bandwidth previously allocated to the carrier Ethernet service.

6. The method of claim 1, wherein:
   the carrier Ethernet service comprises an Ethernet virtual circuit ("EVC") having the customer premises device as one endpoint; and
   the adjusting comprises increasing or decreasing the amount of bandwidth allocated to the EVC.

7. The method of claim 1, further comprising:
   detecting, by the customer premises device, a bandwidth adjustment trigger event; and
   generating and transmitting, by the customer premises device in response to the bandwidth adjustment trigger event, the request to the network interface device over the UNI.

8. The method of claim 7, wherein the detecting comprises:
   receiving, from the network interface device across the UNI, a downstream Ethernet local management interface ("E-LMI") protocol message containing data representative of status information associated with the carrier Ethernet service; and determining, based at least in part on the status information, a satisfaction of one or more predefined conditions of the bandwidth adjustment trigger event.

9. The method of claim 1, embodied as computer-executable instructions on at least one non-transitory computer-readable medium.

10. A method comprising:
detecting, by a customer premises device configured to access a carrier Ethernet service over a user network interface ("UNI"), a bandwidth adjustment trigger event;
generating and transmitting, by the customer premises device in response to the detecting of the bandwidth adjustment trigger event, an Ethernet layer operation, administration, and management ("OAM") protocol based message to a network interface device over the UNI, the Ethernet layer OAM protocol based message including a request to adjust an amount of bandwidth allocated to the carrier Ethernet service upstream of the network interface device;
receiving, by the network interface device, the Ethernet layer OAM protocol based message transmitted by the customer premises device over the UNI;
translating, by the network interface device, the Ethernet layer OAM protocol based message to a carrier Ethernet service network control plane protocol message; and
sending, by the network interface device, the carrier Ethernet service network control plane protocol message to a network core subsystem, the carrier Ethernet service network control plane protocol message configured to instruct the network core subsystem to adjust the bandwidth allocated to the carrier Ethernet service across a carrier Ethernet service network in accordance with the request.

11. The method of claim 10, wherein the detecting comprises:
receiving, from the network interface device across the UNI, a downstream Ethernet local management interface ("E-LMI") protocol message containing data representative of status information associated with the carrier Ethernet service; and
determining, based at least in part on the status information, a satisfaction of one or more predefined conditions of the bandwidth adjustment trigger event.

12. The method of claim 10, wherein the Ethernet layer OAM protocol based message comprises an upstream Ethernet local management interface ("E-LMI") protocol based message.

13. The method of claim 12, wherein the upstream E-LMI protocol based message is an extension of an Ethernet local management interface ("E-LMI") protocol.

14. The method of claim 10, wherein:
the carrier Ethernet service comprises an Ethernet virtual circuit ("EVC") having the customer premises device as one endpoint; and
the request requests an adjustment to an amount of bandwidth allocated to the EVC.

15. The method of claim 10, further comprising automatically adjusting, by the network core subsystem in response to the carrier Ethernet service network control plane protocol message, the amount of bandwidth allocated to the carrier Ethernet service across the carrier Ethernet service network.

16. The method of claim 10, embodied as computer-executable instructions on at least one non-transitory computer-readable medium.

17. A system comprising:
a network interface device that receives an Ethernet layer operation, administration, and management ("OAM") protocol based message provided by a customer premises device over a user network interface ("UNI"), the Ethernet layer OAM protocol based message including a request to adjust an amount of bandwidth allocated to a carrier Ethernet service; and
a carrier Ethernet network core subsystem communicatively coupled to the network interface device and configured to adjust the amount of bandwidth allocated to the carrier Ethernet service upstream of the network interface device,
wherein the network interface device:
translates the Ethernet layer OAM protocol based message to a carrier Ethernet service network core control plane protocol message; and
sends the carrier Ethernet service network core control plane protocol message to the carrier Ethernet network core subsystem to instruct the carrier Ethernet network core subsystem to adjust the bandwidth allocated to the carrier Ethernet service across a carrier Ethernet service network in accordance with the request.

18. The system of claim 17, wherein the carrier Ethernet network core subsystem:
receives the carrier Ethernet service network core control plane protocol message; and
automatically adjusts, in response to the carrier Ethernet service network control plane protocol message, the amount of bandwidth allocated to the carrier Ethernet service across the carrier Ethernet service network.

19. The system of claim 17, wherein the Ethernet layer OAM protocol based message comprises an upstream Ethernet local management interface ("E-LMI") protocol based message.

* * * * *